United States Patent
Yamamoto

(10) Patent No.: US 9,884,562 B2
(45) Date of Patent: Feb. 6, 2018

(54) VEHICLE POWER SUPPLY DEVICE

(71) Applicant: NISSAN MOTOR CO., LTD., Yokohama-shi, Kanagawa (JP)

(72) Inventor: Naoki Yamamoto, Hachioji (JP)

(73) Assignee: NISSAN MOTOR CO., LTD., Yokohama-Shi, Kanagawa (JP)

( * ) Notice: Subject to any disclaimer, the term of this patent is extended or adjusted under 35 U.S.C. 154(b) by 196 days.

(21) Appl. No.: 14/782,000

(22) PCT Filed: Mar. 20, 2014

(86) PCT No.: PCT/JP2014/057670
§ 371 (c)(1),
(2) Date: Oct. 2, 2015

(87) PCT Pub. No.: WO2014/162883
PCT Pub. Date: Oct. 9, 2014

(65) Prior Publication Data
US 2016/0059720 A1    Mar. 3, 2016

(30) Foreign Application Priority Data

Apr. 5, 2013    (JP) ................................ 2013-079604

(51) Int. Cl.
*H02J 7/00*      (2006.01)
*B60L 11/18*      (2006.01)
(Continued)

(52) U.S. Cl.
CPC ........... *B60L 11/1818* (2013.01); *B60L 1/006* (2013.01); *B60L 11/14* (2013.01); *B60L 11/1803* (2013.01); *B60L 11/185* (2013.01); *B60L 11/1816* (2013.01); *B60L 11/1824* (2013.01); *B60L 11/1842* (2013.01); *B60L 11/1846* (2013.01); *B60L 11/1861* (2013.01); *B60L 11/1864* (2013.01); *B60L 2210/10* (2013.01); *B60L 2210/40* (2013.01); *B60L 2240/80* (2013.01); *B60L 2250/10* (2013.01); *B60L 2250/16* (2013.01); *B60L 2270/32* (2013.01);
(Continued)

(58) Field of Classification Search
CPC ............................. B60L 11/1818; B60L 1/006
USPC ................................................. 320/109, 134
See application file for complete search history.

(56) References Cited

FOREIGN PATENT DOCUMENTS

GB      2466561 A      6/2010
JP      2001258177 A    *   9/2001      .............. B60L 1/003
(Continued)

*Primary Examiner* — Drew A Dunn
*Assistant Examiner* — Zixuan Zhou
(74) *Attorney, Agent, or Firm* — Young Basile Hanlon & MacFarlane, P.C.

(57) ABSTRACT

A vehicle power supply device including a battery and mounted in a vehicle capable of traveling by using a motor as a drive source includes an external charging terminal used to charge the battery from an external power supply or an external charger; an external output terminal used to discharge the battery to supply electricity from the battery to an electric device; and a mark display unit configured to display a charging mark indicating that the battery is being charged and a discharging mark indicating that the battery is being discharged to supply electricity to the electric device. The charging mark and the discharging mark each have a shape resembling a plug and respectively include terminals pointing in opposite directions.

2 Claims, 7 Drawing Sheets

(51) Int. Cl.
  *B60L 11/14* (2006.01)
  *B60L 1/00* (2006.01)
(52) U.S. Cl.
  CPC ......... *B60L 2270/34* (2013.01); *Y02E 60/721* (2013.01); *Y02T 10/70* (2013.01); *Y02T 10/7005* (2013.01); *Y02T 10/7044* (2013.01); *Y02T 10/7061* (2013.01); *Y02T 10/7072* (2013.01); *Y02T 10/7077* (2013.01); *Y02T 10/7216* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/169* (2013.01); *Y04S 10/126* (2013.01); *Y04S 30/14* (2013.01)

(56) References Cited

FOREIGN PATENT DOCUMENTS

| | | |
|---|---|---|
| JP | 2004-276672 A | 10/2004 |
| JP | 2008-296669 A | 12/2008 |
| JP | 2010149553 A | 7/2010 |
| JP | 2011146261 A | 7/2011 |
| JP | 2012-085383 A | 4/2012 |

* cited by examiner

VEHICLE POWER SUPPLY DEVICE

CROSS REFERENCE TO RELATED APPLICATION

The present application is based on Japanese Patent Application No. 2013-079604 filed on Apr. 5, 2013, the entire content of which is herein incorporated by reference.

TECHNICAL FIELD

The present invention relates to a vehicle power supply device and particularly relates to a technique which allows a user to easily recognize charging and discharging states of a battery.

BACKGROUND

A vehicle power supply device as follows has been conventionally proposed. A high-voltage battery is mounted in a vehicle and DC electrical power outputted from the battery is converted to AC electrical power by an inverter to supply electrical power to an accessory socket (see, for example, Japanese Patent Application Publication No. 2004-276672). Mounting the power supply device in the vehicle enables an operation of an electric device in the vehicle. Accordingly, for example, a mobile phone can be charged in the vehicle by connecting a charger of the mobile phone to the power supply device.

However, when the fact that the battery mounted in the vehicle is being discharged to supply electricity to the electric device via the accessory socket is displayed, a user may confuse the display indicating that the battery is being discharged to supply electricity the electric device, with a display indicating that the battery is being charged by using an external power supply or an external charger, and make erroneous recognition.

SUMMARY

An object of the present invention is to provide a vehicle power supply device which prevents confusion and erroneous recognition by allowing a user to clearly determine whether a battery is being charged or is being discharged to supply electricity to an electric device.

A vehicle power supply device according to one aspect of the present invention is a vehicle power supply device including a chargeable and dischargeable battery and mounted in a vehicle capable of traveling by using a motor as a drive source, the vehicle power supply device comprising: an external output terminal used to supply electricity from the battery to an electric device by discharging the battery; and a mark display unit configured to display a charging mark indicating that the battery is being charged and a discharging mark indicating that the battery is being discharged to supply electricity to the electric device, wherein the charging mark and the discharging mark each have a shape resembling a plug and respectively include terminals pointing in opposite directions.

DETAILED DESCRIPTION OF THE EMBODIMENTS

Figure 1:
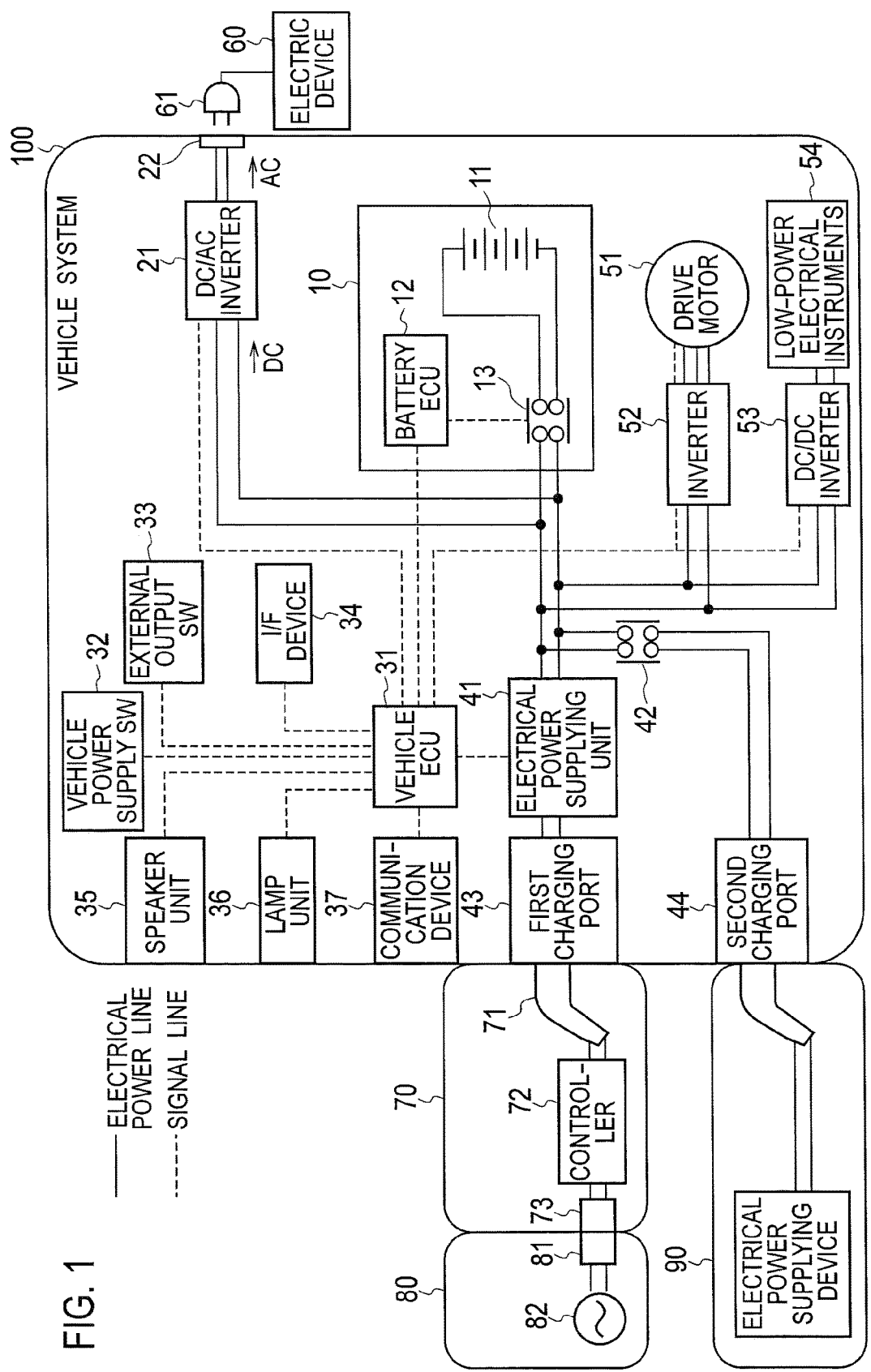
FIG. 1 is a block diagram illustrating an example of a vehicle system including a vehicle power supply device in an embodiment of the present invention and peripheral devices of the vehicle system.

Next, an embodiment of the present invention is described with reference to the drawings. In the illustrations of the following drawings, the same or similar parts are denoted by the same or similar reference numerals. Moreover, the embodiment described below exemplifies a device and a method which embody the technical spirit of the invention, and materials, shapes, structures, arrangements, and the like of constitutional parts in the technical spirit of the invention are not specified to those described below. In the technical spirit of the present invention, various changes can be made within the scope of claims.

Moreover, a vehicle system including a vehicle power supply device in the embodiment of the present invention can be mounted in a vehicle such as an electric car, a hybrid car, and a plug-in hybrid car which can travel by using a motor as a drive source. In the embodiment of the present invention, description is given of an example in which the vehicle system is mounted in an electric car.

As illustrated in FIG. 1, the vehicle system 100 in the embodiment of the present invention includes a first charging port 43 to which electrical power supplied from a charging cable 70 is inputted, a battery pack 10 which is charged to store the electrical power supplied via the first charging port 43 and which is discharged to supply the stored electrical power as necessary, and an electrical power supplying unit 41 which converts and steps up the electrical power supplied from the first charging port 43 and supplies the electrical power to the battery pack 10.

The battery pack 10 includes a chargeable and dischargeable battery 11 capable of storing and supplying high-voltage DC electrical power, a battery electronic control unit (battery ECU) 12 configured to control the charging and discharging of the battery 11, and a relay 13 configured to be switched such that a connection line of the battery 11 is connected and disconnected. The battery ECU 12 monitors the charging state of the battery 11 and controls the charging and discharging of the battery 11 by switching the relay 13 for the connection and disconnection. Moreover, the battery ECU 12 sends a signal indicating the charging state of the battery 11 to a vehicle ECU 31 to be described later.

The vehicle system 100 also includes a DC/AC inverter 21 which converts the DC electrical power outputted from the battery pack 10 to AC electrical power of a desired voltage (for example, 50 Hz, AC 100V) and a plug socket (external output terminal) 22 which is a connection portion for supplying the AC electrical power outputted from the DC/AC inverter 21 to an external electric device (external device) 60.

Moreover, the vehicle system 100 further includes a drive motor 51 used for the traveling of the vehicle, an inverter 52 configured to convert the DC electrical power outputted from the battery pack 10 to AC electrical power and supply the AC electrical power to the drive motor 51, a DC/DC converter 53 configured to convert the voltage of the DC electrical power outputted from the battery pack 10, and low-power electrical instruments 54 configured to operate by electrical power outputted from the DC/DC converter 53. The low-power electrical instruments 54 are, for example, a 12 V battery, headlamps, wipers, various meters, a navigation system, a vehicle interior lighting device, various controllers, and the like.

The vehicle system 100 further includes the vehicle electronic control unit (vehicle ECU) 31 configured to control the entire vehicle system 100 as a whole. A lamp unit 36, a speaker unit 35, a vehicle power supply switch 32, an external output switch 33, an interface (I/F) device 34, and a communication device 37 configured to perform various communications with external devices such as a mobile phone are connected to the vehicle ECU 31. Furthermore, the electrical power supplying unit 41, the DC/AC inverter 21, the battery ECU 12, the inverter 52, and the DC/DC converter 53 are connected to the vehicle ECU 31.

The communication device 37 notifies the state of charging and discharging of the battery 11 by, for example, communicating with external devices at the start of charging of the battery 11, during the charging, or at end of the charging, and at the start of discharging of the battery 11 to the electric device 60, during the discharging, or at the end of the discharging.

The lamp unit 36 notifies the state of charging and discharging of the battery 11 to an occupant by, for example, lighting a lamp installed at an appropriate portion outside or inside the vehicle at the start of the charging of the battery 11, during the charging, or at the end of the charging, and at the start of the discharging of the battery 11 to the electric device 60, during the discharging, or at the end of the discharging.

The speaker unit 35 notifies the state of charging and discharging of the battery 11 to an occupant by, for example, emitting a warning sound from a speaker installed at an appropriate portion inside or outside the vehicle at the start of the charging of the battery 11, during the charging, or at the end of the charging, and at the start of the discharging of the battery 11 to the electric device 60, during the discharging, or at the end of the discharging.

The vehicle power supply switch 32 is a push-type switch for switching activation/shut-down of the vehicle system 100.

The external output switch 33 is a push-type switch, and whether electrical power is outputted from the plug socket 22 or not can be changed by operating the external output switch 33. When the external output switch 33 is set to an ON state, the AC electrical power is outputted from the DC/AC inverter 21. When the external output switch 33 is set to an OFF state, no AC electrical power is outputted from the DC/AC inverter 21.

The I/F device 34 is an interface for setting display modes of various display units and, for example, can change display modes of charging and discharging marks (symbols) to suit the needs of the user.

Furthermore, the vehicle system 100 includes a second charging port 44 configured to be connected to an electrical power supplying device 90 for rapid charging and a relay 42 configured to switch connection/disconnection of the second charging port 44 and the battery pack 10. In the case where there is not much time for charging, the battery 11 can be charged by storing the electrical power supplied from the second charging port 44 with the relay 42 set to the ON state.

The charging cable 70 includes a power supply plug 73 configured to be connected to an external power supply 80, a control box 72, and a charging plug 71 configured to be connected to the first charging port 43. The external power supply 80 includes a commercial power supply 82 (for example, AC 100 V, 50 Hz) and a power supply socket 81. By connecting the power supply plug 73 to the power supply socket 81 and connecting the charging plug 71 to the first charging port 43, AC electrical power outputted from the commercial power supply 82 can be supplied to the first charging port 43.

Note that vehicle ECU 31 and the battery ECU 12 which are described above may be formed as, for example, an integrated computer including a central processing unit (CPU), a RAM, a ROM, and storage means such as a hard disk drive.

In the embodiment of the present invention, when the vehicle is made to travel by driving the drive motor 51, the vehicle ECU 31 performs control such that the electrical power in the battery 11 is supplied to the inverter 52 and the inverter 52 operates to generate three-phase AC electrical power. This AC electrical power is supplied to the drive motor 51 (three-phase AC motor) to drive the drive motor 51. Moreover, the low-power electrical instruments 54 such as headlamps and wipers can be driven by causing the DC/DC converter 53 to operate.

Next, description is given of operations performed in the charging of the battery 11 mounted in the battery pack 10 of the vehicle power supply device in the embodiment of the present invention.

The user plugs the charging plug 71 of the charging cable 70 into the first charging port 43 of the vehicle system 100, and also plugs the power supply plug 73 into the power supply socket 81 of the external power supply 80. Then, the electrical power outputted from the commercial power supply 82 is supplied to the first charging port 43 via the charging cable 70 and is further supplied to the electrical power supplying unit 41.

Figure 2A:
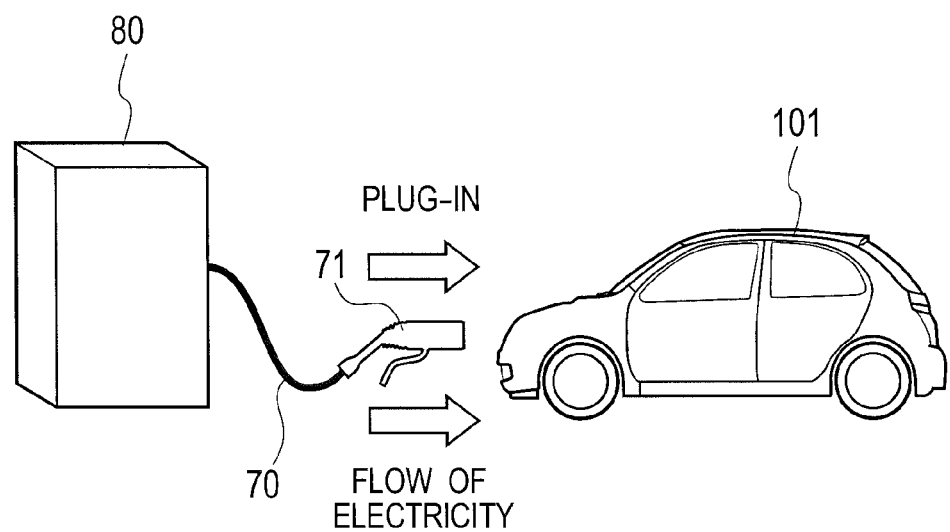
FIG. 2A is a schematic view showing a state where a battery is charged in the embodiment of the present invention.

A state where the battery 11 is charged as described above is schematically illustrated in FIG. 2A. The charging plug 71 of the charging cable 70 is plugged into a vehicle 101 and the electricity flows from the external power supply 80 side to the vehicle 101 side. In other words, a plug-in direction of the charging plug 71 and a direction of the flow of electricity are the same.

Moreover, the battery ECU 12 provided in the battery pack 10 illustrated in FIG. 1 monitors the charging state of the battery 11 and, when the battery 11 is in a chargeable state, outputs this information to the vehicle ECU 31. Furthermore, the battery ECU 12 sets the relay 13 to the ON state. The vehicle ECU 31 outputs an instruction signal for executing the charging of the battery 11 to the electrical power supplying unit 41. When receiving this instruction signal, the electrical power supplying unit 41 steps up the AC electrical power supplied from the first charging port 43 to a desired voltage, converts the AC electrical power to DC electrical power, and outputs the DC electrical power to the battery 11. The electrical power can be thereby stored in the battery 11. After the charging of the battery 11 is completed, the charging plug 71 is removed.

In the case of rapid charging, charging can be performed in a short time by connecting the electrical power supplying device 90 for rapid charging to the second charging port 44.

Next, description is given of operations related to control of performing and stopping the supplying of the electrical power to the plug socket 22 in the vehicle system 100 in the embodiment of the present invention.

When the user turns on the external output switch 33, an operation signal of the external output switch 33 is outputted to the vehicle ECU 31, and the vehicle ECU 31 performs control of outputting a drive instruction and an ON instruction of the DC/AC inverter 21. As a result, the electrical power in the battery 11 is supplied to the DC/AC inverter 21, and the DC/AC inverter 21 operates to convert the DC electrical power to AC electrical power (for example, 50 Hz, AC 100V). The AC electrical power is then supplied to the plug socket 22. The electric device 60 can be thus charged or made to operate by plugging a power plug 61 of the electric device 60 into the plug socket 22.

Figure 2B:
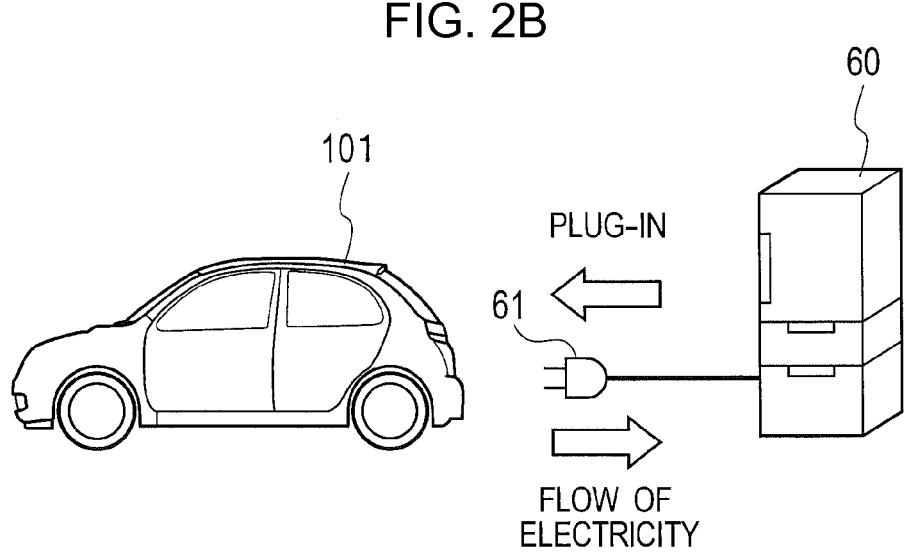
FIG. 2B is a schematic view showing a state where the battery is discharged to supply electricity to an electric device in the embodiment of the present invention.

A state where the battery 11 is discharged to supply electrical power to the electric device 60 as described above is schematically illustrated in FIG. 2B. The power plug 61 of the electric device 60 is plugged into the vehicle 101 and the electricity flows from the vehicle 101 (battery 11) side to the electric device 60 side. In other words, a plug-in direction of the power plug 61 of the electric device 60 and a direction of the flow of electricity are opposite to each other. Note that the plug socket 22 may be provided inside or outside the vehicle.

Meanwhile, the supply of electrical power to the plug socket 22 can be stopped by turning off the external output switch 33 illustrated in FIG. 1. Specifically, when the external output switch 33 is turned off, an instruction signal of the external output switch 33 is outputted to the vehicle ECU 31, and the vehicle ECU 31 performs control such that the supply of electrical power to the DC/AC inverter 21 is stopped and the operation of the DC/AC inverter 21 is stopped. The supply of electrical power to the plug socket 22 is thus stopped.

Note that, when the discharging to the electric device 60 is performed simultaneously with the charging of the battery 11 using the external power supply 80 or the like, control may be performed such that the electrical power is supplied to the electric device 60 from the battery 11 or such that the electrical power is supplied to the electric device 60 from the external power supply 80 or the like while bypassing the battery 11.

The vehicle ECU 31 in the embodiment of the present invention has a function of a mark display unit configured to display a charging mark (charging symbol) indicating that the battery 11 is being charged and a discharging mark (discharging symbol) indicating that the battery 11 is being discharged to supply the electrical power to the electric device 60. The charging mark and the discharging mark are displayed at positions where the marks are recognizable by the user, for example, in an instrument panel or the like.

Figure 3:
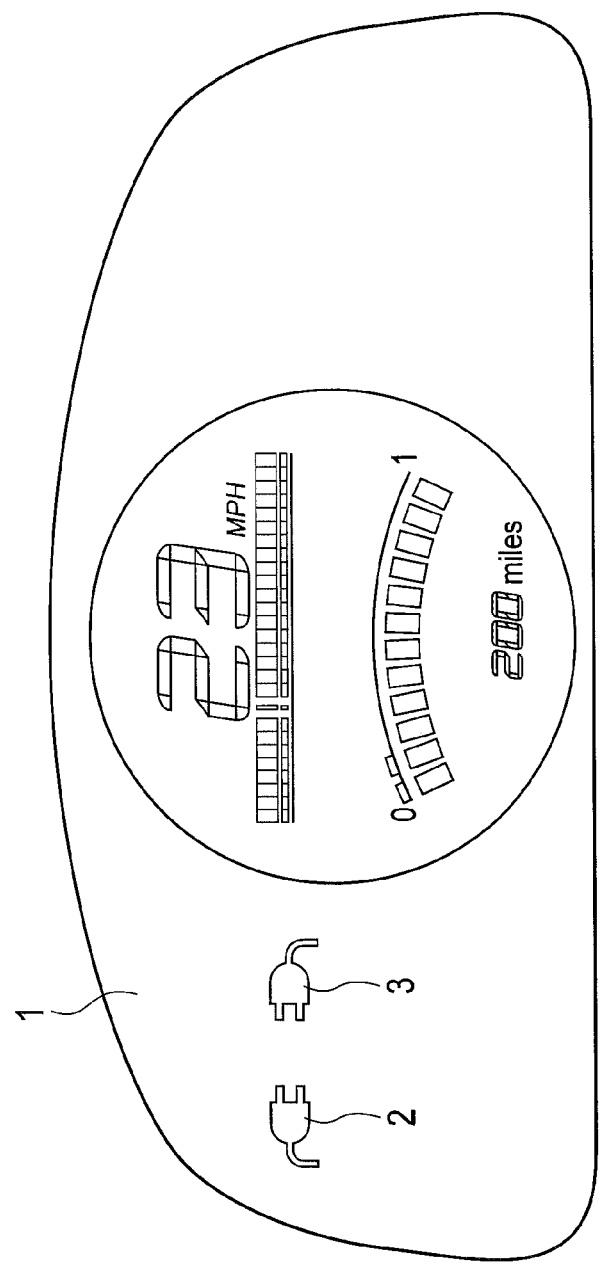
FIG. 3 is a schematic diagram showing an example of a display in an instrument panel in the embodiment of the present invention.

FIG. 3 shows the case where the charging mark 2 and the discharging mark 3 are displayed in the instrument panel 1. The display of the charging mark 2 is turned on during the charging of the battery 11 and is turned off in other cases. The display of the discharging mark 3 is turned on during the discharging of the battery 11 to the electric device 60 and is turned off in other cases. When the charging of the battery 11 and the discharging of the battery 11 to the electric device 60 is performed simultaneously, the display of both of the charging mark 2 and the discharging mark 3 is turned on.

Figure 4:
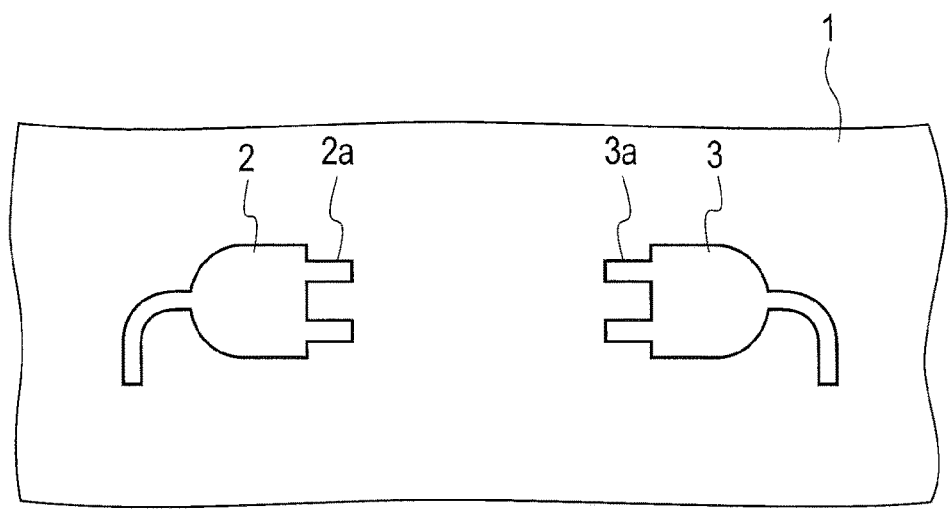
FIG. 4 is a schematic view showing an example of a display of a charging mark and a discharging mark in the embodiment of the present invention.

As illustrated in FIG. 4, each of the charging mark 2 and the discharging mark 3 has a shape resembling a plug and, in the embodiment of the present invention, has a shape resembling a power plug. The charging mark 2 and the discharging mark 3 respectively have a set of terminals 2a and a set of terminals 3a pointing in the opposite directions. Specifically, the terminals 2a of the charging mark 2 are directed rightward and point right. Meanwhile, the terminals 3a of the discharging mark 3 is directed leftward and point left. Furthermore, the charging mark 2 is arranged on the left side while the discharging mark 3 is arranged on the right side. The charging mark 2 and the discharging mark 3 are arranged such that the terminal 2a side of the charging mark 2 and the terminal 3a side of the discharging mark 3 face each other.

Figure 5:
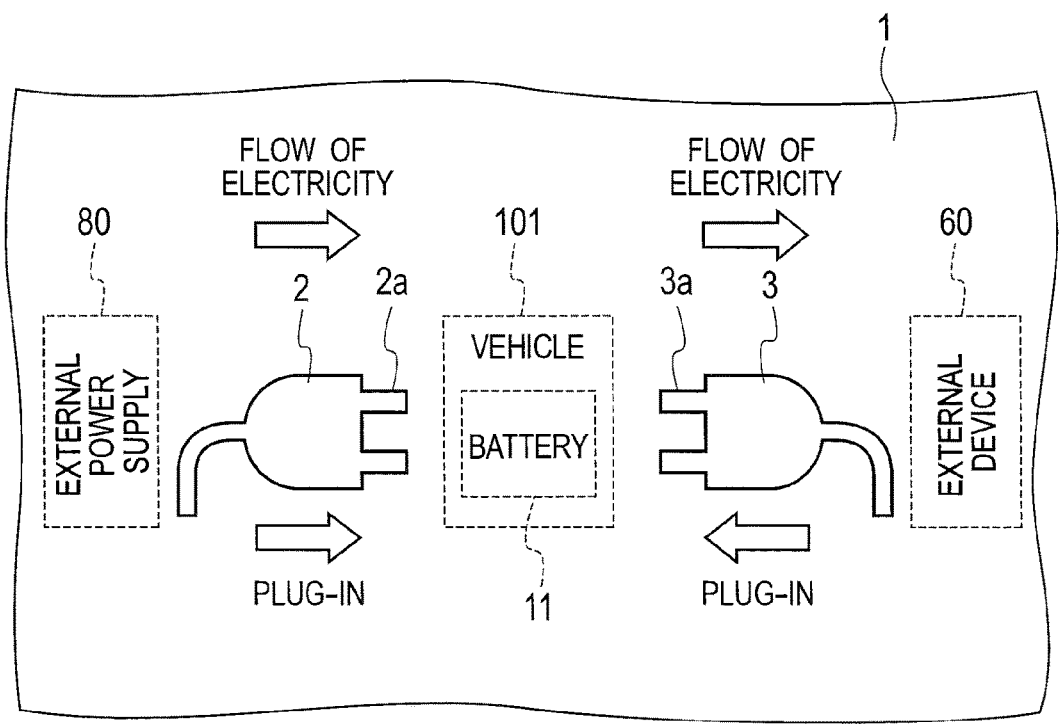
FIG. 5 is a schematic view showing an image recalled by the charging mark and the discharging mark in the embodiment of the present invention.

Displaying the charging mark 2 and the discharging mark 3 as described above allows the user to easily recall the states (images) of the charging and discharging of the battery 11 as illustrated in FIG. 5. Specifically, since the direction in which the terminals 2a of the charging mark 2 point is opposite to the direction in which the terminals 3a of the discharging mark 3 point, the user can easily recall the state where the direction in which the charging plug 71 is plugged into the vehicle 101 and the direction in which the power plug 61 of the electric device 60 is plugged into the vehicle 101 are opposite to each other with respect to the vehicle 101.

Moreover, a principle (hard-and-fast rule) in a general circuit diagram is that the power supply is arranged on the left side and electricity flows from left to right. In view of this, the direction in which the terminals 2a of the charging mark 2 point being right allows the user to easily recall the state where the external power supply 80 is arranged on the left side of the battery 11 and the vehicle 101 and the electricity flows from the external power supply 80 on the left side to the battery 11 and the vehicle 101 on the right side. Meanwhile, the direction in which the terminals 3a of the discharging mark 3 point being left allows the user to easily recall the state where the battery 11 and the vehicle 101 are arranged as a power supply on the left side of the electric device 60 and the electricity flows from the battery 11 and the vehicle 101 on the left side to the electric device 60 on the right side. Furthermore, arranging the charging mark 2 on the left side and arranging the discharging mark 3 on the right side allows the user to easily recall the state where the electricity continuously flows from left to right as a whole including the states of the charging and discharging of the battery 11, from the external power supply 80 on the left side to the battery 11 and the vehicle 101 and from the battery 11 and the vehicle 101 to the electric device 60.

Furthermore, causing the terminal 2a side of the charging mark 2 and the terminal 3a side of the discharging mark 3 to face each other allows the user to easily recall the state where one vehicle 101 and one battery 11 exist between the charging mark 2 and the discharging mark 3 as illustrated in FIG. 5.

As described above, in the vehicle power supply device in the embodiment of the present invention, the charging mark 2 and the discharging mark 3 each have the shape resembling a plug having the terminals 2a or 3a, and the terminals 2a of the charging mark 2 and the terminals 3a of the discharging mark 3 point in the opposite directions. This allows the user to easily recall the state where the direction in which the charging plug 71 is plugged into the vehicle 101 is opposite to the direction in which the power plug 61 of the electric device 60 is plugged into the vehicle. Accordingly, the user can clearly determine that the battery 11 is being charged when seeing the charging mark 2, and determine that the battery 11 is being discharged to supply electricity to the electric device 60 when seeing the discharging mark 3. Hence, it is possible to prevent the case where the user confuses or erroneously recognizes that the battery 11 is being charged or is being discharged to supply electricity to the electric device 60.

Moreover, the charging mark 2 having the terminals 2a directed rightward is displayed on the left side and the discharging mark 3 having the terminals 3a directed leftward is displayed on the right side. The charging mark 2 and the discharging mark 3 are thereby displayed according to the hard-and-fast rule of a circuit diagram that a power supply is arranged on the left side and electricity flows from left to right. Accordingly, the user can clearly determine that the battery 11 is being charged when seeing the charging mark 2, and determine that the battery 11 is being discharged to supply electricity to the electric device 60 when seeing the discharging mark 3.

Furthermore, displaying the charging mark 2 and the discharging mark 3 such that the terminal 2a side of the charging mark 2 and the terminal 3a side of the discharging mark 3 face each other allows the user to recall the state where the vehicle 101 and the battery 11 exist between the charging mark 2 and the discharging mark 3 as illustrated in FIG. 5. As a result, the user can clearly determine that the battery 11 is being charged when seeing the charging mark 2, and determine that the battery 11 is being discharged to supply electricity to the electric device 60 when seeing the discharging mark 3.

FIRST MODIFIED EXAMPLE

Figure 6A:
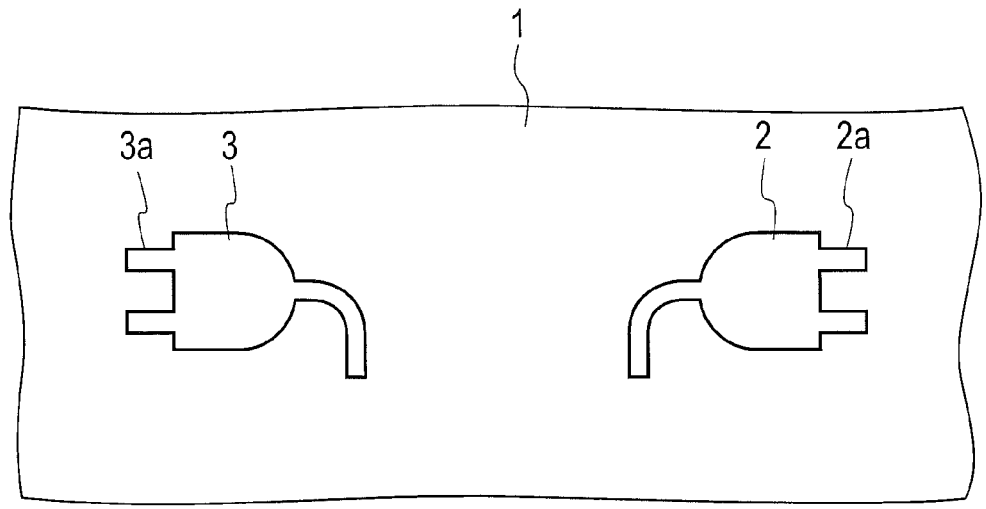
FIG. 6A is a schematic view showing an example of a display of the charging mark and the discharging mark in a first modified example of the embodiment of the present invention.

The positions where the charging mark 2 and the discharging mark 3 are displayed are not limited to those illustrated in FIG. 4. For example, as illustrated in FIG. 6A, the display may be such that the charging mark 2 having the terminals 2a directed rightward is arranged on the right side and the discharging mark 3 having the terminals 3a directed leftward is arranged on the left side. Moreover, as illustrated in FIG. 6B, the charging mark 2 and the discharging mark 3 may be displayed one on top of the other.

Figure 6B:
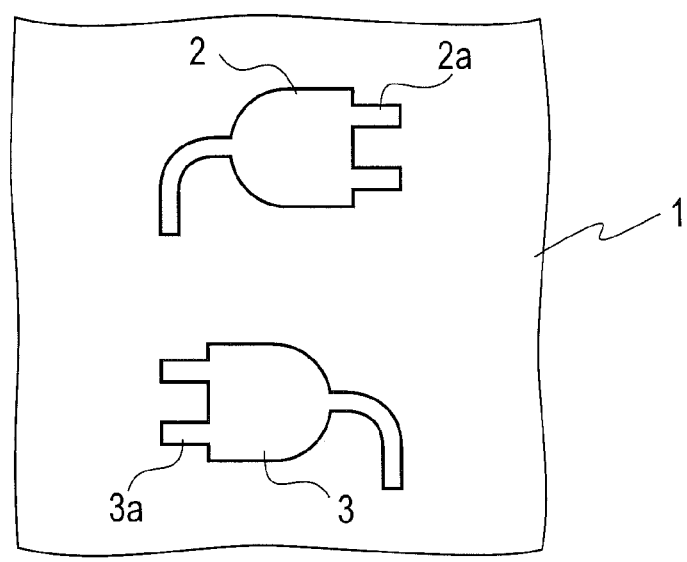
FIG. 6B is a schematic view showing another example of a display of the charging mark and the discharging mark in the first modified example of the embodiment of the present invention.

Even when the charging mark 2 and the discharging mark 3 are arranged as illustrated in FIGS. 6A and 6B, since the directions in which the terminals 2a and 3a point are opposite to each other, the user can easily recall the state where the direction in which the charging plug 71 is plugged in the charging is opposite to the direction in which the power plug 61 of the electric device 60 is plugged in the discharging.

Moreover, the charging mark 2 and the discharging mark 3 may be configured as follows. The terminals 2a of the charging mark 2 of FIG. 4 are made to point leftward and the terminals 3a of the discharging mark 3 of FIG. 4 are made to point rightward so that the direction in which the terminals 2a of the charging mark 2 point can be opposite to the direction in which the terminals 3a of the discharging mark 3 point. In this case, since at least the directions in which the terminals 2a and 3a point are opposite to each other, the user can clearly determine whether the charging and the discharging is performed or not when seeing the display of the charging mark 2 and the discharging mark 3, as long as the user recognizes in advance which one of the charging mark 2 and the discharging mark 3 indicates the charging and which one of the charging mark 2 and the discharging mark 3 indicates the discharging.

SECOND MODIFIED EXAMPLE

Moreover, the shapes of the charging mark 2 and the discharging mark 3 are not limited to the shapes resembling a power plug for commercial power supply, and may be other shapes capable of pointing in one direction. Furthermore, the shapes of the charging mark 2 and the discharging mark 3 are not limited to the shapes of the same type and may be shapes of different types.

Figure 7A:
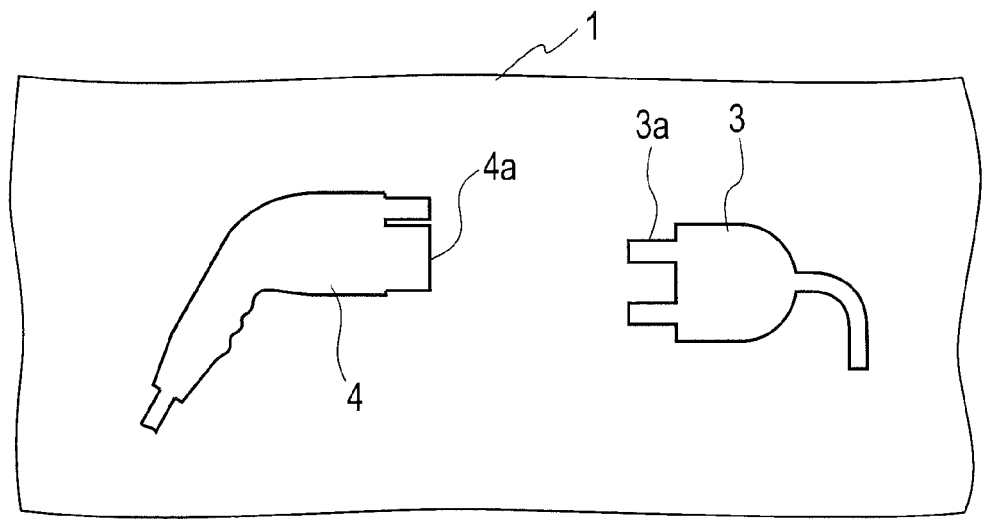
FIG. 7A is a schematic view showing an example of a display of the charging mark and the discharging mark in a second modified example of the embodiment of the present invention.

For example, as illustrated in FIG. 7A, a charging mark 4 may have a shape resembling a charging plug of a gun of a normal charger, and the discharging mark 3 may have the shape resembling a power plug. A terminal 4a of the charging mark 4 is directed rightward and points right.

Figure 7B:
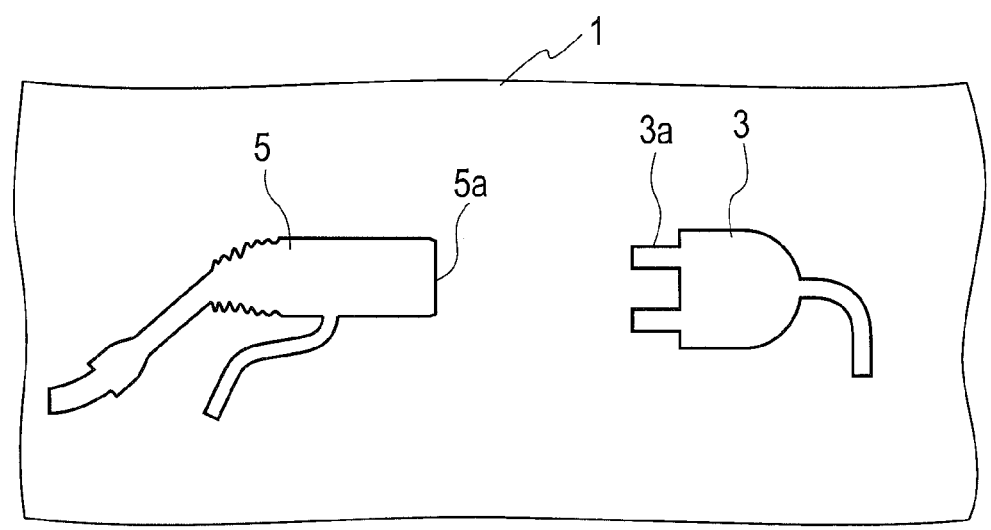
FIG. 7B is a schematic view showing another example of a display of the charging mark and the discharging mark in the second modified example of the embodiment of the present invention.

Moreover, as illustrated in FIG. 7B, a charging mark 5 may have a shape resembling a charging plug of a gun of a rapid charger, and the discharging mark 3 may have the shape resembling a power plug. The terminal 5a of the charging mark 5 is directed rightward and points right.

Moreover, although the charging mark 2 and the discharging mark 3 each have two terminals in the illustration of FIG. 4, a charging mark and a discharging mark which each have three or more terminals can be displayed.

THIRD MODIFIED EXAMPLE

Figure 8:
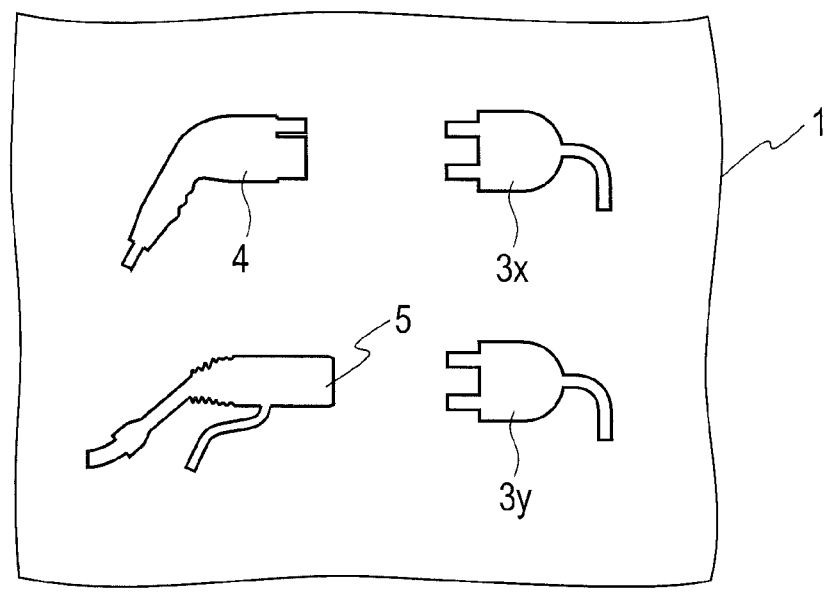
FIG. 8 is a schematic view showing an example of a display of the charging mark and the discharging mark in a third modified example of the embodiment of the present invention.

Moreover, as illustrated in FIG. 8, it is possible to enable a display of multiple marks such as the charging mark 4 having the shape of a gun of a normal charger and the charging mark 5 having the shape of a gun of a rapid charger and change the display of the marks in the normal charging and the rapid charging.

Moreover, when multiple sockets (plug sockets) are provided in the vehicle 101, multiple discharging marks 3x and 3y corresponding to the respective sockets may be displayed as illustrated in FIG. 8. In this case, the discharging marks 3x and 3y may be denoted by numbers or have different shapes or colors to be individually recognizable.

(Fourth Modified Example)

Figure 9:
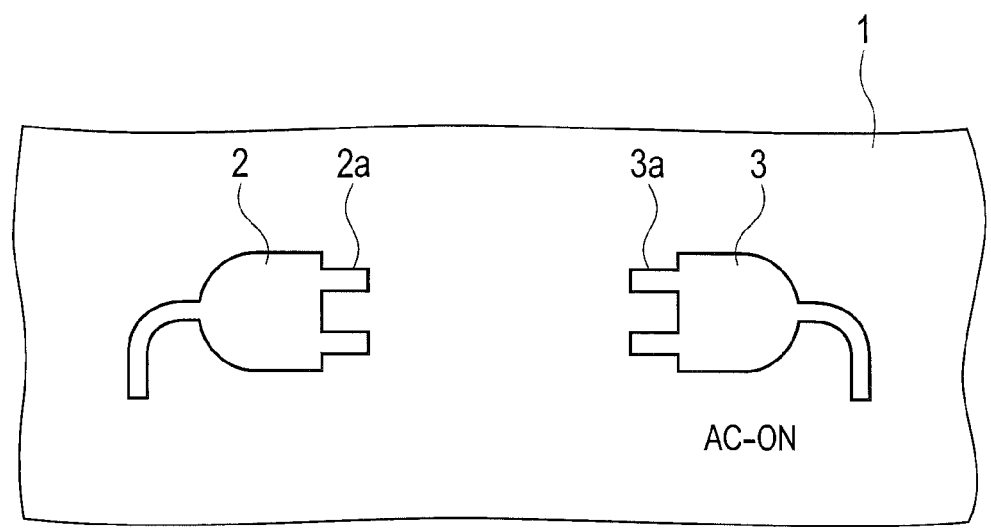
FIG. 9 is a schematic view showing an example of a display of the charging mark and the discharging mark in a fourth modified example of the embodiment of the present invention.

Moreover, in addition to the charging mark 2 and the discharging mark 3, character strings, symbols, or the like may be further displayed near the charging mark 2 and the discharging mark 3 so that the user can more easily recognize whether the charging and the discharging is performed or not. For example, in the example illustrated in FIG. 9, a character string of "AC-ON" is displayed below the discharging mark 3.

Although the contents of the present invention are described above by using the embodiment of the present invention, the present invention is not limited by the description of the embodiment. It is obvious to those skilled in the art that various modifications and improvements can be made.

The invention claimed is:

1. A vehicle power supply device including a chargeable and dischargeable battery, mounted in a vehicle capable of traveling by using a motor as a drive source, discharging the battery when a discharging plug of an electric device is plugged into a vehicle and electricity flows from the battery to the electric device and charging the battery when a charging plug of a charging cable connected to an external power supply is plugged into the vehicle and electricity flows from the external power supply to the battery, the vehicle power supply device comprising:
  an external output terminal used to discharge the battery to supply electricity from the battery to the electric device; and
  a mark display unit configured to display a charging mark indicating that the battery is being charged from the external power supply and a discharging mark indicating that the battery is being discharged to supply electricity to the electric device, wherein
  the charging mark which has a shape resembling a plug and includes a terminal which points a direction in which the charging plug is plugged into the vehicle,
  the discharging mark which has a shape resembling a plug and includes a terminal which points a direction in which the discharging plug is plugged into the external output terminal, and
  the charging mark and the discharging mark are arranged such that the terminal side of the charging mark and the terminal side of the discharging mark face each other.

2. The vehicle power supply device according to claim 1, wherein
  the terminal of the charging mark is directed rightward,
  the terminal of the discharging mark is directed leftward, and
  the charging mark is displayed on a left side of the discharging mark.

* * * * *